(12) United States Patent
Bush et al.

(10) Patent No.: US 7,077,579 B2
(45) Date of Patent: Jul. 18, 2006

(54) LOW PROFILE SPLICING STAGE FOR OPTICAL FIBER WAVEGUIDES

(75) Inventors: Simon P. Bush, Ambler, PA (US); John A. Crowell, Wilmington, DE (US); John A. Snedeker, Chatham, PA (US)

(73) Assignee: Aurora Instruments, Inc., Ambler, PA (US)

(*) Notice: Subject to any disclaimer, the term of this patent is extended or adjusted under 35 U.S.C. 154(b) by 114 days.

(21) Appl. No.: 10/806,838

(22) Filed: Mar. 23, 2004

(65) Prior Publication Data

US 2004/0190839 A1 Sep. 30, 2004

Related U.S. Application Data

(60) Provisional application No. 60/456,903, filed on Mar. 24, 2003.

(51) Int. Cl.
*G02B 6/255* (2006.01)

(52) U.S. Cl. ............................. 385/96; 385/97; 385/98

(58) Field of Classification Search .................... None
See application file for complete search history.

(56) References Cited

U.S. PATENT DOCUMENTS

| | | | | |
|---|---|---|---|---|
| 5,013,345 A | * | 5/1991 | Itoh et al. ..................... 65/407 |
| 5,561,728 A | * | 10/1996 | Kobayashi et al. ........... 385/97 |
| 5,611,015 A | * | 3/1997 | Tokumaru et al. ............ 385/98 |
| 5,904,413 A | * | 5/1999 | Ruegenberg et al. ...... 356/73.1 |
| 6,046,798 A | * | 4/2000 | Zamzow ..................... 356/73.1 |
| 6,206,583 B1 | * | 3/2001 | Hishikawa et al. ........... 385/96 |
| 2002/0131729 A1 | * | 9/2002 | Higgins, III .................. 385/91 |
| 2002/0159724 A1 | * | 10/2002 | Oki et al. ...................... 385/97 |

* cited by examiner

*Primary Examiner*—Kaveh Kianni
(74) *Attorney, Agent, or Firm*—Ernest D. Buff & Associates, LLC; Ernest D. Buff; Gordon E. Fish

(57) ABSTRACT

A splicing stage for fusion joining two optical fibers comprises an electric arc welding system, a clamping and fiber position adjustment system, and an optional imaging optical system. The stage is preferably incorporated in a compact, low profile, modular fusion splicing system that employs a local injection and detection system to optimally align and position the fibers before fusion. The system is rugged, portable, and capable of operating in an adverse environment. Compact and low in profile, the splicing stage and system are operable with minimal clearance to adjacent equipment and structures and with only a minimal amount of free fiber slack available. Simplicity of design and operation enable accurate alignment and reproducible formation of low transmission loss spliced joints.

21 Claims, 7 Drawing Sheets

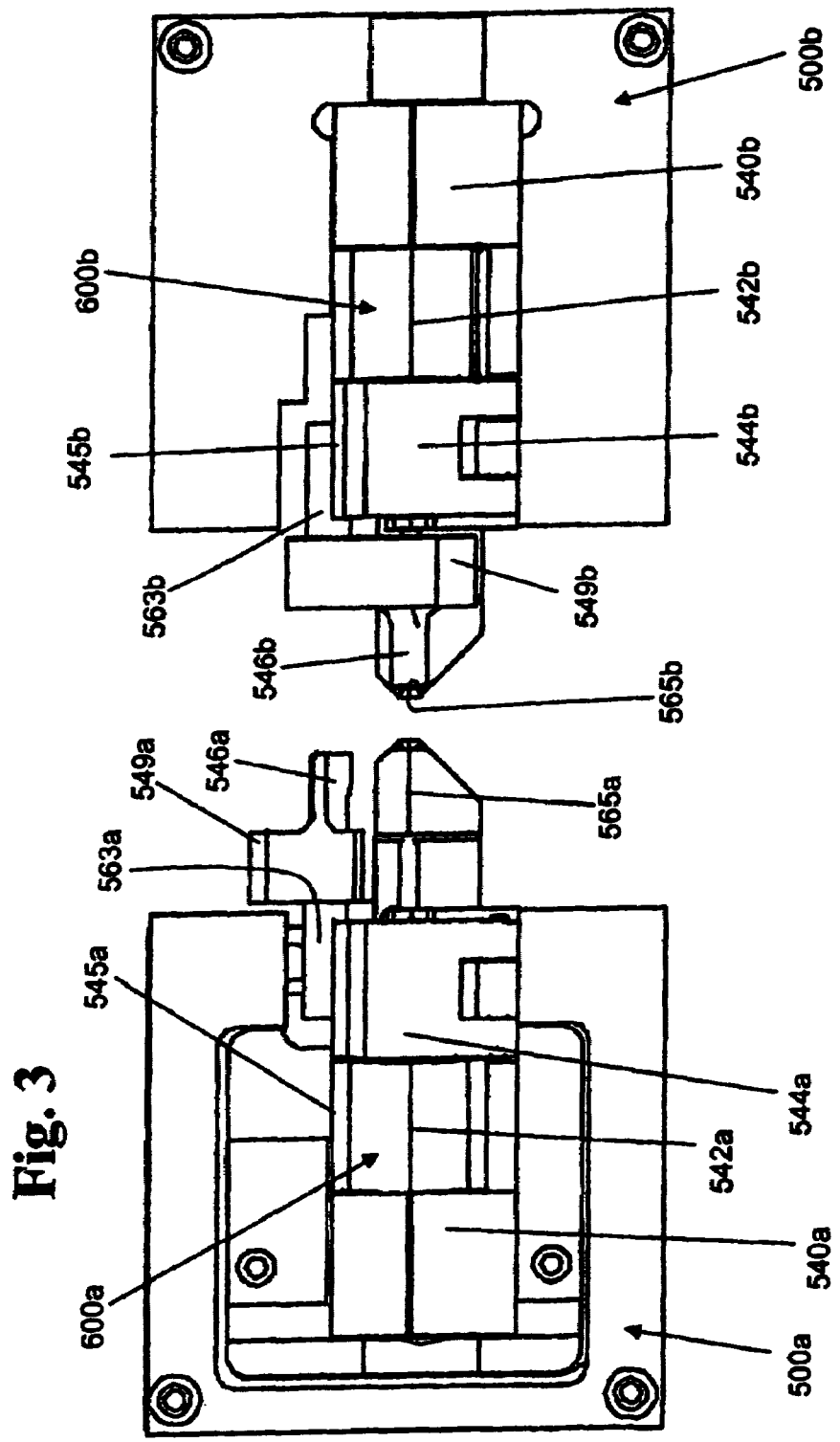

LOW PROFILE SPLICING STAGE FOR OPTICAL FIBER WAVEGUIDES

This Application claims the benefit of application No. 60/456,903, filed Mar. 24, 2003.

BACKGROUND OF THE INVENTION

1. Field of the Invention

This invention relates to a splicing stage for joining optical fiber waveguides; and more particularly, to a low profile splicing stage including an electric arc welding system, holding means for holding first and second optical fibers appointed for fusion splicing, motion means for optimally positioning the fibers before fusion; and an optical system for imaging the fibers, the stage being adapted for incorporation in a system for optical fiber splicing.

2. Description of the Prior Art

Transmission of data by optical fiber waveguides, also called fiber optics or optical fibers, has become ubiquitous in the telecommunications and computer industries. Digital information in an electronic system is converted into a series of pulses of light generated by lasers or light emitting diodes (LED's), which are injected into long fibers of glass or polymeric materials. The fibers are capable of propagating the light with extremely low losses and acceptably low dispersion, whereby information embodied in the modulation pattern may be conveyed. The light that emerges from the other end of the fiber can be detected and reconverted into electronic signals that faithfully reproduce the original signal.

Fiber optic communication has a number of advantages over traditional transmission means such as hard-wired coaxial and twisted pair cable and lower frequency electromagnetic broadcasting such as radio and microwave. Foremost is the much larger bandwidth available. In addition, existing infrastructure such as cable ducts, utility poles, and the like presently used by telecommunications companies can be upgraded with relatively little disruption and moderate cost by substituting optical fiber cable for existing copper wire. Thus, dramatic increases in bandwidth needed to accommodate the needs of an information-based, Internet-driven society and commerce can be obtained with comparatively little disruption.

Fiber optic communications have additional advantages for certain specialized requirements. Fiber optic connections are far less vulnerable to electromagnetic disruptions and nuclear radiation, whether of natural origin or the result of the use of certain military weapons. Fiber optics are now widely used in aerospace and shipboard applications for many of these reasons.

Implementation of fiber optic systems requires both the equipment for actual transmission and processing of the data, and the equipment needed to install and maintain the fiber optic system and its infrastructure. The transmission and processing equipment, such as the fiber itself and the corresponding components needed to generate, detect, and process optically-borne information, have been developed to an ever increasing level of sophistication. While certain systems for joining and splicing fiber optic cables have been developed, there remains a need in the art for improved equipment and methods for splicing that are reliable, economical, and which result in minimal loss of signal integrity and strength. Such systems, equipment, and methods are essential if the full inherent advantages of optical transmission are to be more widely implemented.

The need for improved methods is especially acute for field installation and repair, which are frequently carried out under adverse conditions. Among the most significant needs is for effective means of splicing fiber optic cables both during initial installation and when repairs or modifications are needed. In the telecommunications industry, repairs frequently must be made to overhead lines by a technician operating from a ladder, lift bucket, sometimes during darkness and with adverse weather conditions such as precipitation, cold, and wind. Other repairs must be made in cramped conditions in underground vaults and cable lockers.

Fiber optic communication systems are also commonly used for process control, data, and voice communications in industrial and manufacturing facilities. In these venues, the immunity of optical systems to electronic and electromagnetically-induced noise and the elimination of electrical hazards are particularly beneficial. Cables in these locations are often routed through tight quarters, some in hazardous locations, making access for repair difficult. Communication systems on ships and in airplanes and spacecraft likewise advantageously employ fiber optic transmission; cable routing and access are often comparably problematic in these applications. In most of the aforementioned situations repair is further hampered because of the limited length of slack in the fiber that may be accessible for the technician to manipulate into a splicing device. The need for a system usable for making emergency repairs on fiber optic systems aboard military aircraft, ships, and submarines under operational or battle conditions is especially acute.

Together, these considerations call for splicing systems that are compact, portable, and able to be operated rapidly and reliably under adverse working conditions and with minimal slack cable. Moreover, it is desired that such a splicing system be capable of joining two fibers in a way that (i) causes minimal disruption or discontinuity in the optical transmission, (ii) does not adversely increase the diameter and volume of the cable, and (iii) has a durability as close as possible to that of an original fiber. Systems are also desired that are simple and reliable enough to be used by technicians who lack extensive training. There remains an urgent need for optical splicing systems that satisfy these requirements.

Optical fiber waveguides in common use share a number of structural features. The waveguide almost invariably comprises a thin, elongated fiber core responsible for conducting the light and at least one additional layer. Most often the fiber core is highly pure glass surrounded by a first and intimately bonded layer termed a cladding and an outer layer called a buffer. The cladding, usually also glass, has an index of refraction lower than that of the core to insure that light is constrained for transmission within the core by total internal reflection. Typically the buffer is composed of plastic or polymer and serves to protect the inner layers mechanically and to prevent attack by moisture or other substances present in the fiber's environment. Commonly a plurality of individual fibers (in some cases as many as a thousand) constructed in this fashion are bundled together and enclosed in a protective jacket to form a cable.

Commonly used fibers may further be classified as multimode or single mode. Multimode fibers typically comprise cores having diameters of 50–62.5 µm but in some cases up to 100 µm. Single mode fibers generally have a much smaller core that may be 9 µm or less in diameter. The glass cladding diameter is most commonly 125 µm but sometimes is 140 µm (with a 100 µm core). The exterior diameter is largely a function of the buffer coating, with 250 µm most common, although some fiber coatings may be as much as 900 μm in diameter. Alignment of fibers is a crucial part of the preparation for any splicing operation, but is especially challenging for single mode fibers that have small core diameter. In order to produce a high quality, low-loss splice, the two opposing ends to be joined must be aligned laterally to within a small fraction of the core diameter. Of course, the smaller the fiber diameter, the smaller the allowed deviation from perfect abutting alignment that may be tolerated.

Most fiber optic data transmission systems transmit information using electromagnetic radiation in the infrared band, including wavelengths such as 850 nm for multimode fibers and 1310 and 1550 nm for single mode fibers. The nomenclature "light" is invariably employed for this radiation, even though the cited wavelengths fall outside the range visible to humans.

Two general approaches for splicing optical fibers are in widespread use, viz. mechanical and fusion splicing. Mechanical splicing is accomplished by securing the ends of two fibers in intimate proximity with an aligning and holding structure. Often the fibers are inserted into the opposing ends of a precision ferrule, capillary tube, or comparable alignment structure. The fibers are then secured mechanically by crimping, clamping, or similar fastening. An adhesive is also commonly used. In some cases a transparent material such as a gel having an index of refraction similar to that of the fiber cores is used to bridge the gap between the fibers to minimize reflection losses associated with the splice. Mechanical splicing is conceptually simple, and minimal apparatus is required to effect splicing. However, even in the best case, a mechanical splice has relatively high and undesirable insertion loss, typically 0.20 dB. In addition, mechanical splices are generally weaker than the underlying fiber and are notoriously vulnerable to degradation of the optical quality of the splice over time, especially under adverse environmental conditions such as varying temperatures and high humidity. Mechanical splices are generally regarded as being temporary expedients at best and are not useful for high bandwidth systems or permanent joints.

Fusion splicing entails the welding of the two fiber ends to each other. That is, the ends are softened and brought into intimate contact. The softening is typically induced by heat from a small electric arc struck between miniature pointed electrodes mounted in opposition and substantially perpendicular to the common axis of the fibers. Upon cooling, a strong, low-loss joint is formed. When properly carried out, fusion splices exhibit very low losses along with high stability and durability rivaling those of the uncut fiber. Mechanical protection is often provided by a heat-shrinkable tube applied over the completed joint. The tube replaces the buffer coating that generally must be removed prior to splicing. In many cases the heat-shrinkable tube is reinforced by incorporation therein of a length of metallic wire for stiffness.

One essential requirement for a low insertion loss splice is careful preparation and precise alignment of the ends of the fibers being joined. The axes of the fibers must be collinear within about 0.1 degree and aligned laterally within a small fraction of the core diameter to achieve the desired loss of less than about 0.03 dB. This required precision of alignment presents a substantial technical challenge, especially with single-mode fibers having cores approximately 9 μm diameter. Three general approaches have been proposed in the prior art. The simplest expedient is the use of mechanical fixturing, such as the alignment ferrules described above and other forms of pre-aligned V-grooves and the like. These purely mechanical approaches do not reliably produce splices that maintain less than 0.10 dB loss and so are ill suited for the demands of advanced, high-bandwidth communications systems. More sophisticated approaches employ some form of optically assisted fiber positioning. One such method is termed a profile alignment system (PAS). In this approach, the splicing apparatus incorporates an optical system that acquires images of the two fibers taken in two lateral directions, allowing the fibers to be positioned in two directions orthogonal to the mutual fiber axes. PAS systems may incorporate either manual positioning or may employ computerized image processing to optimize the alignment. However, the diffraction limit and the resolution of available electro-optic cameras restrict the precision achievable with PAS, even in systems based on visible light with wavelengths of about 400–700 nm. This particularly compromises the effectiveness of PAS in aligning small diameter, single mode fibers.

Still more advanced positioning methods have been proposed that employ measurement of actual light transmission between the fibers being joined. The positioning of the fibers is adaptively adjusted to maximize light transmission prior to the fusion operation. It is found that under carefully controlled laboratory conditions this approach may permit alignment better than that achievable with PAS systems.

However, the methods and apparatus for carrying out splicing aided either by the PAS or transmission-based alignment techniques have heretofore not been well suited for use outside the laboratory or other similarly controlled workplace. The required equipment lacks the flexibility, versatility, and ruggedness needed for field use. Moreover, present equipment is cumbersome and not operable in the confined spaces frequently encountered during field service.

Notwithstanding numerous advances in the field of fiber optic joining, there remains a need in the art for an economical, efficient process for forming low-loss, durable, and reliable splices in fiber optic cables. Also needed is portable splicing equipment that can be operated by technicians without extensive training to accurately and efficiently join fiber optic cables in tightly confined spaces and under adverse environmental conditions.

SUMMARY OF THE INVENTION

The present invention provides a splicing stage adapted to be incorporated in a compact, low profile splicing system for fusion joining a first and a second optical fiber waveguide. The stage includes an electric arc welding system; a clamping and fiber position adjustment system comprising holding means for holding the fibers in a fiber plane and motion means for moving said fibers in three orthogonal dimensions into coaxial, abutting alignment along a common fiber axis in the fiber plane; and an imaging optical system having a fiber imaging illuminator and a fiber image detector. The imaging optical system is adapted to acquire optical images of the fibers in a first imaging direction and a second imaging direction, the imaging directions being non-coincident. The image detector provides an electrical signal adapted to be received by imaging electronics and processed to produce a display. The stage is used in connection with a fiber optic splicing system that uses optical alignment means to bring the two fibers into optimal alignment prior to fusion, resulting in the reliable formation of joints that exhibit advantageously low transmission loss.

In one embodiment of the stage, the imaging optical system employs a fiber imaging illuminator that comprises a first light source for the first imaging direction and a second light source for the second imaging direction. Light from each respective source traverses an optical path that is multiply folded and includes optical elements located both above and below the fiber plane. Each optical path lies in a plane perpendicular to the common fiber axis.

The stage also comprises holding means preferably including fiber clamp assemblies that are removable to permit stripping of any buffer coating or cladding present on the optical fibers using an auxiliary, offline fiber preparation apparatus.

Motion means are provided to bring the fibers into coaxial, abutting relationship prior to splicing. Preferably such alignment is optically assisted using at least one of a profile alignment system (PAS) and a local injection and detection (LID) system. The motion means may incorporate any form of pneumatic or electromechanical drive capable of positioning the optical fibers. Preferably, direct-drive stepper motors and piezoelectric actuators are used. In one embodiment, the fibers are secured using the holding means to respective carriages that are driven axially by stepper motors engaging lead screws. The stepper motors are used to bring the fibers axially into approximate abutment. More accurate positioning is preferably carried out with piezoelectric actuators. In an embodiment of the present stage, a first transverse piezoelectric actuator drives the first fiber in a first direction transverse to the common fiber axis; a second transverse piezoelectric actuator drives the second fiber in a second direction transverse to the common fiber axis and perpendicular to the first direction, and an optional axial piezoelectric actuator drives the second fiber in the common fiber direction. In other embodiments both first and second transverse piezoelectric actuators drive the same one of the fibers.

PAS and LID systems provide feedback signals for a servo system that command these mechanical drives to bring the fibers into optimal coaxial, facing alignment. Afterward, the fibers are joined by fusion to form a low-loss joint. The accurate alignment achievable by the present stage in conjunction with these detection systems advantageously results in reliable formation of joints through which optical signals may propagate with their signal strength and integrity maintained, because the insertion loss and back reflection attributable to the joints are rendered extremely low. In addition, the simplicity and light weight of a drive system incorporating direct-drive motors and piezoelectric actuators minimizes inaccuracy due to gear backlash and gravity-driven bending and deformation of the system's components. As a result, a splicing system incorporating the present splicing stage and other rugged, low profile components is operable in any spatial orientation, facilitating the splicing system's use in awkward locations.

Advantageously, the present stage may be incorporated in a fiber optic splicing system that is modular, compact, and low in profile. As a result of its configuration, the system may be employed under challenging environmental and operational conditions. The arrangement of the fiber in the system is simple and direct, the path remaining substantially in a horizontal single plane parallel to the substrate on which the LID injector and detector and splicing stage are situated. Moreover, the path deviates from a straight line only insofar as necessary to provide sufficient bending to allow insertion and extraction of light for operation of the LID technique. As a result of this simple configuration and component design, a fusion splicing system incorporating the present LID system can operate in very restricted quarters, such as very close to a wall, ceiling, floor, or cable support structure such as a cable tray, and in circumstances wherein the amount of slack available for insertion of fibers into the system is strictly limited. By way of contrast, prior art systems have required much larger fiber loops with correspondingly more slack needed and so were frequently not operable in tight quarters.

The present splicing stage is also simple to operate. In an aspect of the invention, the mounting of the fiber in the stage is accomplished simply, as the device is fully actuated by manipulation of its cover. Opening the cover allowing the fiber to be inserted and properly situated in joint clamps that secure the fiber close to the end to be spliced; closure secures the fiber in these clamps. The simplicity of the operation allows it to be accomplished by workers who lack extensive training. Moreover, fibers can be mounted with a minimum of manual dexterity and manipulation, as well as in adverse conditions, such as bad weather or poor lighting, which make it difficult or impossible for the operator to see the equipment and the workpieces. In the telecommunications industry, a technician frequently is required to work on overhead lines from a lift bucket in adverse weather and in darkness or in underground cable vaults or lockers. In military systems, e.g. aboard ships or aircraft, repairs must often be carried out during operational or battlefield conditions. A splicing system incorporating the present splicing stage is able to carry out these functions. By way of contrast, prior art splicing systems generally have lacked the ruggedness and portability needed for low loss, durable fusion splicing under these field conditions. Instead, they have generally required carefully controlled conditions for reliable operation and so have not been able to operate under the aforementioned circumstances, for which there is an acute need.

BRIEF DESCRIPTION OF THE DRAWINGS

The invention will be more fully understood and further advantages will become apparent when reference is had to the following detailed description of the various embodiments of the invention and the accompanying drawings, wherein like reference numerals denote similar elements throughout the several views, and in which:

FIG. 3 is a plan view depicting portions of the fiber clamping and positioning systems also shown in FIG. 2;

FIG. 4b depicts in bottom plan view the actuator also seen in FIG. 4a;

DETAILED DESCRIPTION OF THE PREFERRED EMBODIMENTS

The present invention is directed to a splicing stage for positioning and fusing two optical fiber waveguides. Preferably the stage is compact and low profile. The stage is particularly adapted for use in conjunction with a fusion splicing system for joining two optical fibers. Preferably the fusion splicing system and stage cooperate to provide control signals that direct the positioning mechanism of the stage to bring the fibers into coaxial, abutting alignment prior to fusion. As a result of the accurate alignment afforded thereby, the transmission loss of the spliced fiber is advantageously low. A fusion splicing system incorporating a low profile local injection and detection system, also known as a LID system, is especially preferred for reproducibly forming low transmission loss joints. Fusion splicing systems that advantageously incorporate the present fusion splicing stage are disclosed in copending application Ser. No. 10/806,533, which is filed of even date herewith, commonly assigned, and incorporated herein in the entirety by reference thereto. A number of low profile LID systems usable in fusion splicing are disclosed in copending application Ser. No. 10/806,538, which is filed of even date herewith, commonly assigned, and incorporated herein in the entirety by reference thereto.

Figure 1:
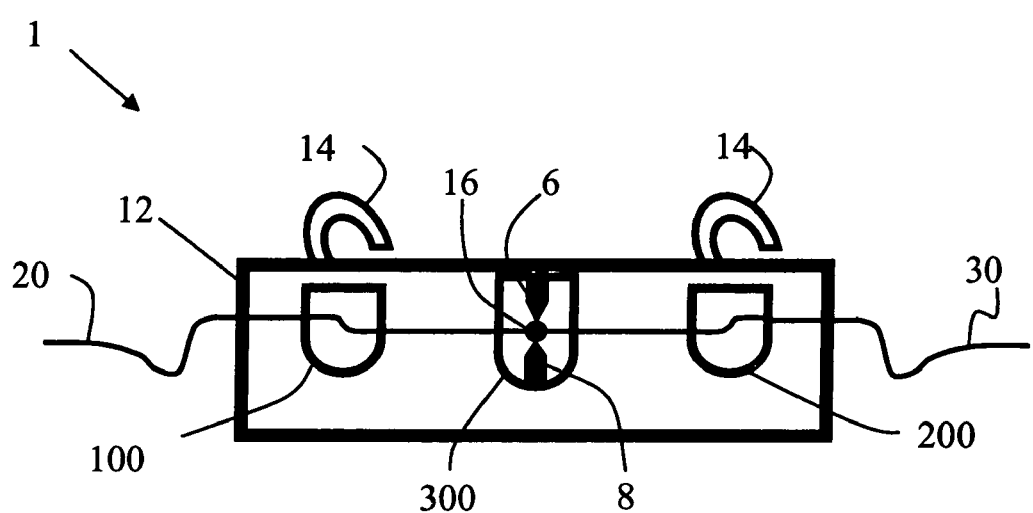
FIG. 1 is a plan view schematically depicting a fusion splicing head incorporating one embodiment of the splicing stage of the invention.

Referring now to FIG. 1 there is depicted generally a fusion splicing head 1 for use in a fusion splicing system. The head incorporates fusion splicing stage 300 of the invention. Optical fibers 20, 30 are positioned in light injector 100 and light detector 200, respectively, and the free ends of the fibers are situated in fusion splicing stage 300. Activation of an electric arc between front electrode 6 and rear electrode 8 causes local softening of the free ends, which are thereby welded to form joint 16. Elements of the fusion splicing head 1 are mounted in housing 12, which has hooks 14 for hanging head 1 in a convenient location for carrying out field service operations. Support means other than hooks 14 may also be employed, such as VELCRO™ attachement, brackets, support stands, and the like. The supply ends of the fibers 20, 30 enter injector 100 and detector 200 in substantially collinear directions. The design of splicing head 1, including both the configuration of injector 100, fusion stage 300, and detector 200, and the path of the fibers 20, 30 through the system, is simple, allowing a splicing system comprising head 1 to be used for joining fibers in close proximity to walls, ceilings, cable support structures, and the like. This functionality is enhanced by a compact and low profile design for splicing head 1 and its constituent components. By "low profile" is meant a system having a small extent in the vertical direction, i.e. the direction perpendicular to the plane in which the fiber path is located. Preferably, the vertical extent of the splicing system does not increase as a result of the opening or closing of the components that must be carried out to situate the fibers for splicing with the splicing system it its operating location. In one aspect of the invention, the present fusion splicing stage incorporates holding means for securing fibers 20, 30; motion means for positioning the fibers; an electric arc welding system; and optionally an imaging optical system for electronically capturing images of the fibers.

Figure 2:
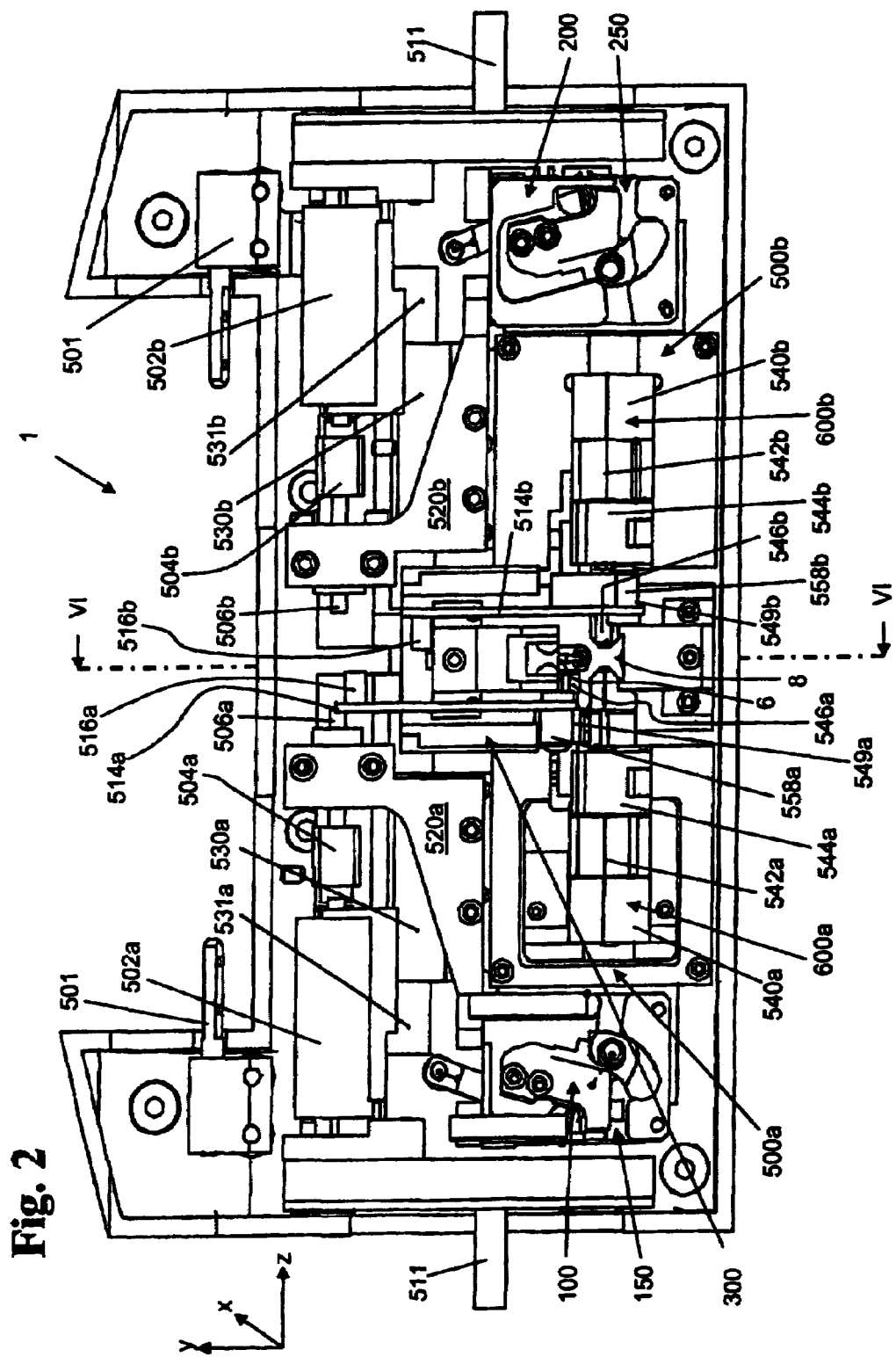
FIG. 2 is a plan view depicting a fusion splicing head incorporating one embodiment of the splicing stage of the invention, including a fiber clamping and positioning system.

As best visualized in FIGS. 2–3, one form of holding means comprises first clamp assembly 600a and second clamp assembly 600b in which are secured fibers 20 and 30, respectively. First clamp assembly 600a includes flat portion 540a, aligning V-block 542a, and first fiber clamp 544a openable at pivot 545a. The vertex of V-block 542a and the flat surfaces of flat portion 540a and clamp 544a are coplanar. Second clamp assembly 600b, which is generally a mirror image of assembly 600a, includes flat portion 540b, aligning V-block 542b, and second fiber clamp 544b openable at pivot 545b. Clamp assemblies 600a and 600b are preferably removably disposed in splicing stage 300.

Preparatory to a fusion splicing operation, first clamp assembly 600a is preferably removed to a convenient remote location. First fiber clamp 544a is opened by rotating it about pivot 545a located at a side lateral to the fiber path defined, e.g., by the V-groove of block 542a. The first fiber is then secured by closing first clamp 544a. Clamp 544a is biased by friction, an elastic element (such as a spring), a magnet, or other similar means to remain in the closed position. Flat portion 540a provides a suitable place for an operator to place his/her thumb to temporarily stabilize the fiber during this operation. The fiber is thereafter prepared by removing a requisite portion of the buffer and cladding, if present, and cleaving the fiber to provide a mating surface that is clean, flat, and perpendicular to the fiber axis, and thus suitable for fusion joining. Preferably the underside of first clamp assembly 600a is provided with fiducial alignment pins permitting it to be reproducibly located in both splicing head 1 and an auxiliary preparation apparatus, each having complementary alignment holes. Of course, the pins and holes may be exchanged in other implementations, and alignment structures incorporating other geometrically interlocking fiducial features may also be used. Advantageously such a preparation apparatus is used for the aforementioned buffer and cladding removal and fiber cleaving. The apparatus permits the axial extent of buffer/cladding removal and the length of fiber projecting from the fiber clamp 544a end of clamp assembly 600a to the mating surface to be established reproducibly. After fiber preparation, first clamp assembly 600a bearing the first fiber is replaced in head 1. A similar operation is preferably carried out to mount and prepare second fiber 30 in second clamp assembly 600b.

The use of an auxiliary, offline fiber preparation and mounting apparatus in carrying out a splicing operation is especially advantageous for field operations, since the fiber ends can be prepared and dimensioned and accurately placed in the splicer under conditions in which limited visibility or difficult working conditions hamper the dexterity of a splicing technician. By way of contrast, previous splicing systems typically have relied on the skill of the technician in preparing the configuration of the fiber to be joined and in placing it accurately in the splicing system.

After both fibers have been prepared and the respective clamp assemblies holding them have been replaced in splicer head 1, the distal ends of the fibers that emerge from the flat portion end of the clamp assembly, e.g. from the flat portion 540a end of system 600a, are mounted in injector 100 and detector 200.

Preferably the free ends of both fibers are further secured as close to the joint location as possible to prevent vibration and movement before completion of alignment and during the welding process. In the embodiment of FIG. 3, the two fibers are respectively secured using flat portions 546a and 546b of movable joint clamps. The flat portions 546a and 546b mate with complementary flat end portions of positioners 500a, 500b, respectively, to create a mild pinching action capturing the fibers. The ends of the positioners are provided with precision V-grooves 565a, 565b that precisely and reproducibly locate respective fibers 20, 30. Optionally, a thin layer of soft polymer is coated on one or both of the flat portions to further secure the fibers. Each of the movable joint clamps pivotally attaches to its corresponding positioner 500a, 500b at pivot mounts 563a, 563b, respectively. Opposite flat portions 546a, 546b, on the joint clamps are respective bifurcated portions 549a, 549b, which engage rotatable sleeves 558a and 558b mounted on one end of actuator linkages 514a, 514b. In the depiction of FIG. 2, for illustrative purposes linkage 514a and flat portion 546a are shown in retracted, open position, while linkage 514b and flat portion 546b are shown in closed position.

In addition a fusion cover over fusion stage 300, at least a portion of which is preferably slidably movable in the fiber plane, has been removed for clarity in FIG. 2. It will be understood that in normal operation, attachments 516a and 516b at the ends of linkages 514a and 514b opposite sleeves 558a and 558b are attached to the same movable fusion cover. Moving the cover operates both linkages 514a, 514b and both flat portions 546a, 546b conjunctively. When the cover is in the rearward, open position, access for inserting the fiber into the fusion stage and its joint clamps is provided; in the cover's closed position, the joint clamps are closed to secure the fibers preparatory to fusion. Preferably the cover is opaque to reduce light interference with the operation of the fiber imaging optical system.

Although the fusion stage cover is omitted in some embodiments of the present splicing stage, the presence of a cover advantageously protects the working area for fiber fusion and exposed elements of the optical system. Embodiments using a stage cover, of which at least a portion is movable in the fiber plane to actuate the joint clamps, are advantageous. An operator needs only to take a single action to clamp both fiber ends. A portion of the cover may also be fixed or upwardly rotatable to provide additional access to the stage or temporary means for securing the fiber during mounting. Preferably, the vertical clearance needed for the stage is not substantially increased by such upward rotation. By way of contrast, previous splicing systems employing upwardly rotatable clamping structures have frequently required extra vertical clearance in situ to operate holding means. Preferably the cover is opaque to reduce interference with the operation of the optional fiber imaging optical system.

Fusion head 1 further comprises mechanical motion means for actively aligning the fibers prior to fusion. In the embodiment of FIGS. 2–3, the vertices of V-blocks 542a, 542b passively establish approximate fiber alignment in both the x and y directions, which are transverse to the common fiber axis. Precision V-grooves 565a and 565b further passively locate and secure the fibers at a point close to the splicing location. However, more accurate alignment is needed, so active positioning is further carried out in both transverse (x,y) and axial (z) directions, preferably using a combination of electric motor and piezoelectric drives. More specifically, rough axial positioning is effected by independently operable stepper motors 502a, 502b. The motors are coupled by couplings 504a, 504b to lead screws 506a, 506b, which in turn rotate to drive carriages 520a and 520b on which are mounted manipulators 500a, 500b. Carriages 520a and 520b ride on slide bars 531a and 531b with interposed bearings 530a and 530b, respectively, to provide smooth, low friction travel. Suitable actuation of motors 502a and 502b thus permits the fibers, which are secured by fiber clamps 600a, 600b to manipulators 500a, 500b, to be moved axially into approximate abutment. Independent motion of the two motors permits the point of abutment to be located symmetrically along an imaginary line connecting electrodes 6, 8, for optimal arc welding. Direct drive of carriages 520a, 520b advantageously eliminates the backlash and other similar imprecision that normally attends gear-driven motion systems frequently employed in prior art splicers. In addition, a direct drive system is more compact, simpler, and far less prone to breakdown. Together, these factors contribute to the ruggedness and portability of the present system.

Figure 4A:
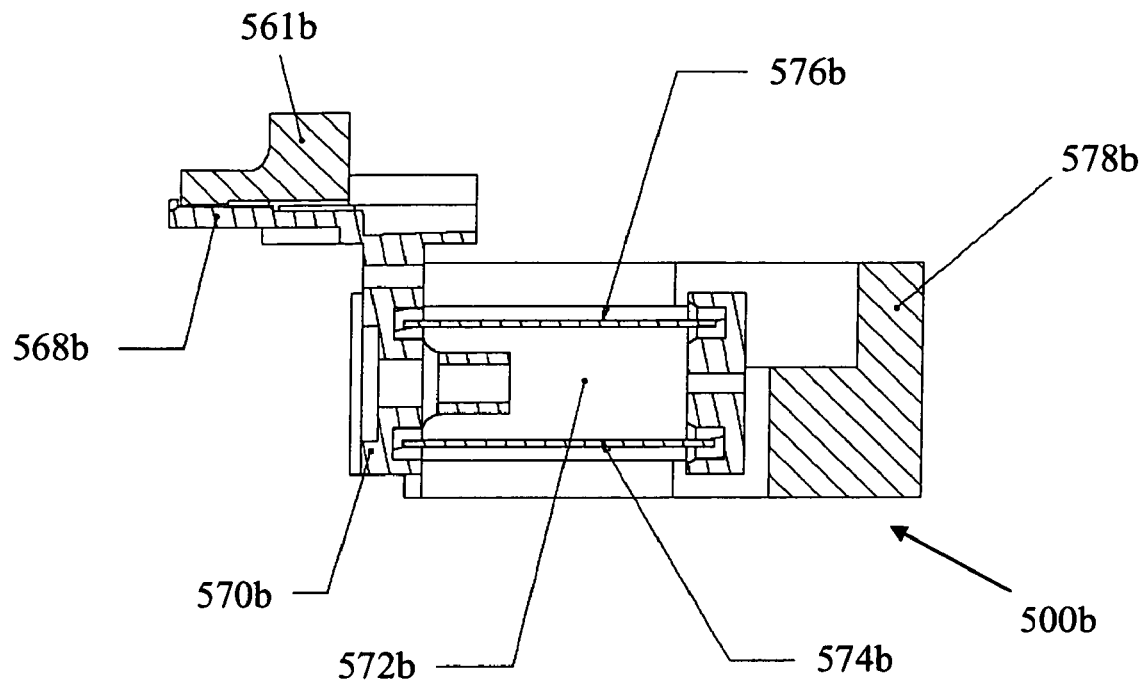
FIG. 4a depicts in side elevation view a piezoelectric actuator that is used in the motion means in one embodiment of the invention to provide two orthogonal transverse motions for the fiber being spliced.
Figure 4B:
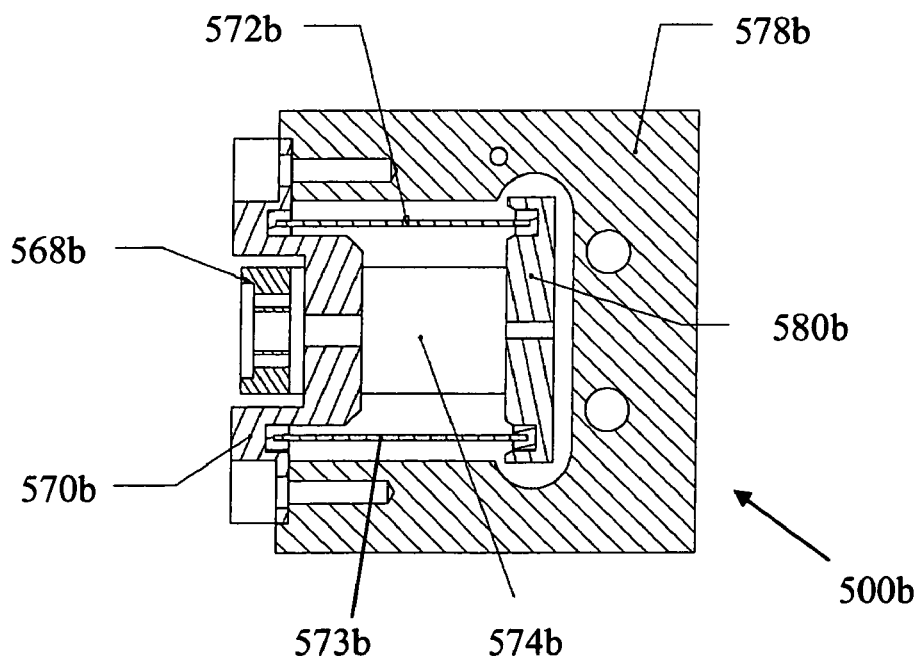
Figure 5:
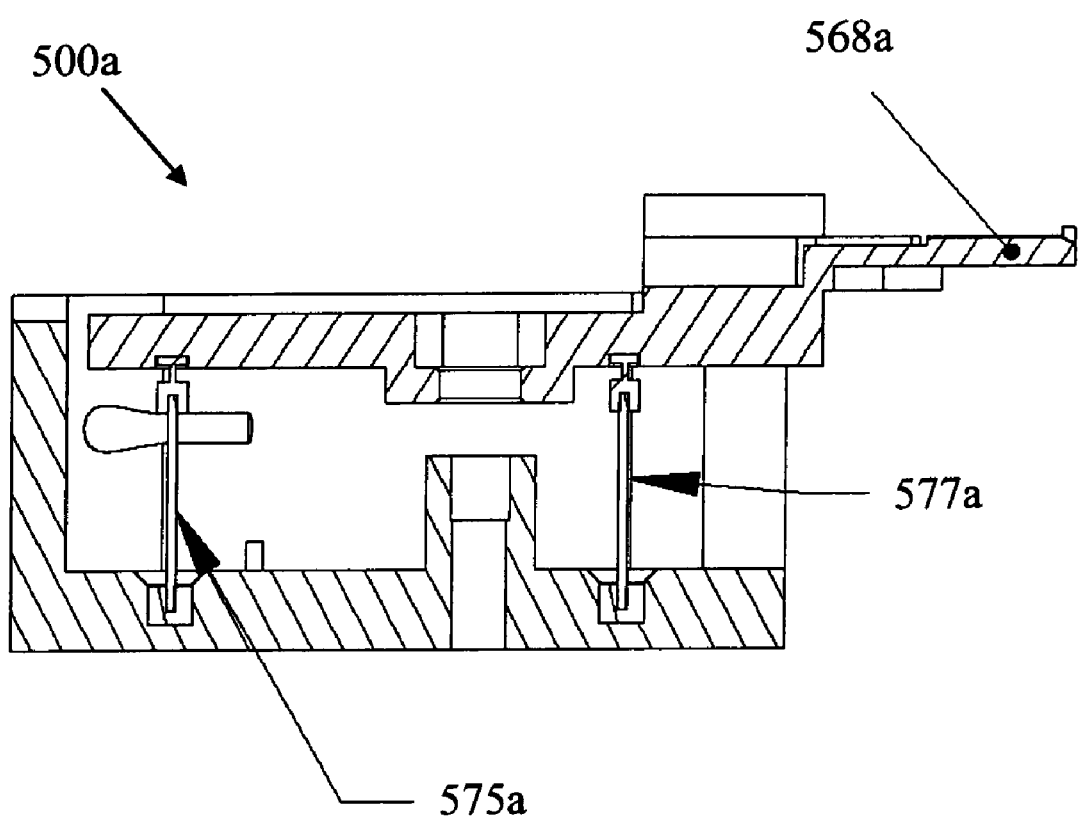
FIG. 5 depicts in side elevation view a piezoelectric actuator that is used in the motion means in one embodiment of the invention to provide axial motion for the fiber being spliced.

More precise alignment of the fibers is preferably carried out using piezoelectric drives comprised in manipulators 500a and 500b, which are best visualized by reference to FIGS. 4–5. In the embodiment shown, drive 500a provides transverse, x-axis motion, while drive 500b provides y-axis transverse and z-axis axial motion. While one skilled in the art will recognize that analysis and alignment is simplest in a system with drive capabilities in three orthogonal directions, it will also be appreciated that any controllable system capable of providing sufficient travel in three non-collinear directions can bring fibers into proper alignment. Other system embodiments optionally permit each of the fibers to be moved independently in three dimensions, but apportioning three directions over two positioners, one for each fiber, as in the embodiment of FIGS. 4–5, will be recognized as sufficient for fiber alignment. The analysis is further facilitated by selecting imaging directions that are transverse to the fiber axis and mutually orthogonal. However, known mathematical transformations can be used to provide the requisite positioning information as long as the imaging directions are not coincident. The alignment process is further facilitated by selecting positioning motions that are mutually orthogonal, with one direction (z) being along the common fiber axis and two (x, y) being transverse to the fiber axis.

Referring now to FIGS. 4–5 the operation of the piezoelectric actuators 500a and 500b in one embodiment may be visualized. FIGS. 4a and 4b show right piezoelectric drive 500b that provides transverse actuation of fiber 30 in two orthogonal transverse directions. Fiber 30 (not shown) is secured between fiber clamp 561b and fiber guide 568b and coupled to the active elements by piezoelectric mount 570b and interstage clamp 580b in housing 578b. First and second y-direction piezoelectric bi-morphs 574b and 576b form a couple to deform to produce y-axis motion, while the couple of piezoelectric bi-morphs 572b and 573b provide x-axis motion. FIG. 5 illustrates left piezoelectric drive 500a in which fiber 20 is mounted between fiber guide 568a and a fiber clamp (not shown). Piezoelectric bi-morphs 575b and 577b provide axially directed (z) motion.

While the stepper motors and piezoelectric actuators depicted in FIGS. 2 and 3–4 are presently preferred for the motion means of fusion stage 300, other forms of pneumatic and electromechanical actuators capable of producing the requisite extent of travel with linear or rotary motion may also be used in practicing the present invention. For example, in some embodiments electric motors actuating fiber motion through a gear train have sufficient accuracy and reliability for use in the present splicer.

The optical imaging system of stage 300 preferably comprises a light source and detector for acquiring images of the joint area from two non-collinear directions. Preferably, the directions are mutually substantially orthogonal and perpendicular to the fiber axis. In an embodiment best visualized in the cross-sectional view of FIG. 6, a first optical path is defined by emission of light from first source 302 of backlighting which reflects from rear source mirror 304 and then illuminates the area of the joint. Light subsequently passes through front lens 306 mounted in a front lens holder 308, and successively reflects from front fold mirror 310 and the front side of reflector 312 before downwardly impinging the active area of camera 314. A second optical path is defined by emission of light from second source 320 which reflects from front source mirror 322 and then illuminates the area of the joint, and subsequently passes through rear lens 324 mounted in a rear lens holder 326, and successively reflects from mirror rear fold 328 and the rear side of reflector 312 before downwardly impinging on camera 314.

Figure 7:
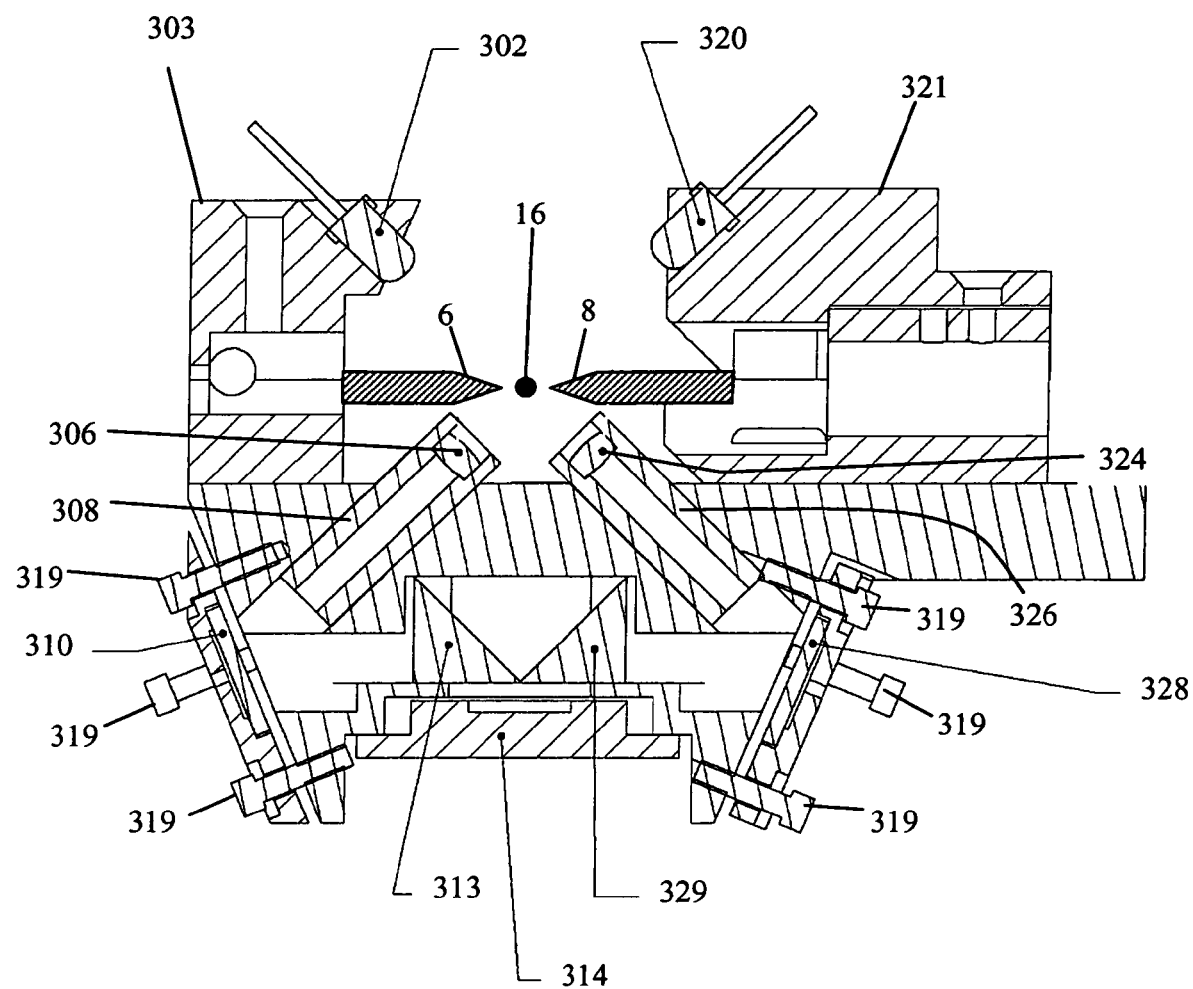
FIG. 7 depicts in cross-section view another embodiment of the splicing stage of the invention, also taken at level VI—VI indicated in FIG. 2.

Another embodiment of the optical imaging system of stage 300 is depicted by FIG. 7. A first optical path is defined by emission of light from a front source 302 of backlighting, mounted in front lamp housing 303, which illuminates the area of fiber joint 16. The light then passes through rear lens 324 mounted in a rear lens holder 326, and successively reflects from rear fold mirror 328 and refracts through rear prism 329 before downwardly impinging the active area of camera 314. A second optical path is defined by emission of light from a rear source 320, mounted in rear lamp housing 321, which illuminates the area of fiber joint 16, then passes through front lens 306 mounted in a front lens holder 308, and successively reflects from front fold mirror 310 and refracts through front prism 313 before downwardly impinging the active area of camera 314. Preferably, a plurality of tilt adjustment screws 331 secures each of mirrors 310 and 328, whereby the optical system can be brought into alignment and secured so that images of the optical fibers in two substantially orthogonal directions are captured in different portions of the active area of camera 314. The images captured by camera 314 are magnified by the lenses and optical system design, preferably at least about 10×, and more preferably, at least about 20×. Preferably, a plurality of tilt adjustment screws 319 secures each of mirrors 310 and 328, whereby the optical system can be brought into alignment and secured so that images of the optical fibers in two substantially orthogonal directions are captured in different portions of the active area of camera 314. The first and second optical paths preferably lie in a plane normal to the common fiber axis and passing through the point of abutment of the fibers.

Figure 6:
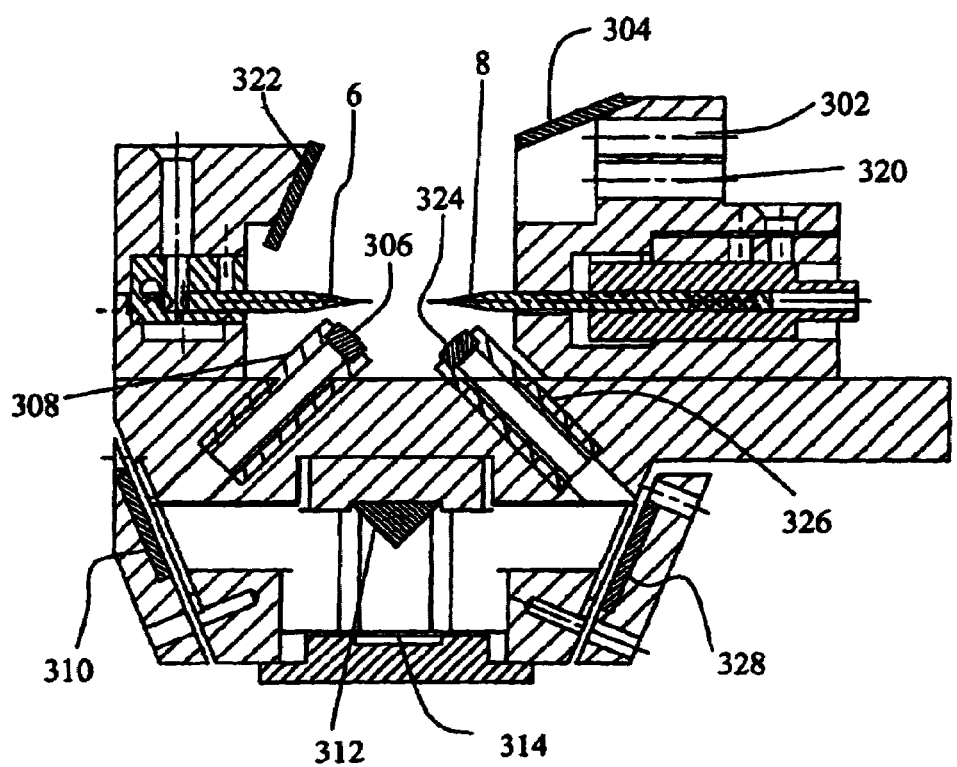
FIG. 6 depicts in cross-section view an embodiment of the splicing stage of the invention taken at level VI—VI indicated in FIG. 2.

In the embodiments depicted by FIGS. 6 and 7, some of the elements in each optical path are located above the fiber plane, and some are below. In addition, each optical path is multiply folded. That is to say, the path includes plural, non-collinear segments, that multiply change direction as a result of the reflective or refractive elements within the path.

More specifically, sources 302 and 320 and mirrors 304 and 322 are located above the fiber plane, i.e., a horizontal plane traversed by the fibers mounted in the LID detector and injector and splicing stage. The remaining optical components, including lenses, mirrors, prisms, and reflectors, and camera, are below the fiber plane. The optical systems depicted by FIGS. 6 and 7 are advantageously compact as a consequence of their multiply-folded optical paths which: (i) lie in a vertical plane perpendicular to the common fiber axis at the location of the fusion joint and (ii) penetrate the horizontal fiber plane. In addition, the components are small and the system has a fixed focus. Advantageously the plane of the optical paths also contains the electrodes 6, 8 of the welding system, minimizing parallax distortion of the fibers near the ultimate joint location. In addition, the optical system employs a single camera 314, which may be any suitable electro-optical image detector having the requisite size, sensitivity, and resolution, but is preferably a charge-coupled or CMOS device. Images of the fiber in substantially orthogonal directions are projected onto different sections of the camera's sensitive area. The camera is appointed for connection to suitable analog or digital electronic processing circuitry that produces an image that may be displayed in real time on a display. The processing optionally includes image enhancement and processing using known image improvement techniques.

The acquired fiber images are optionally but preferably used as input to a PAS system incorporated in a fusion splicing system for adjustment of fiber positioning. Known electronic image analysis techniques, preferably implemented using a microprocessor or comparable circuitry in a control unit, are used to ascertain the relative position of the respective ends of the two fibers. The circuitry then adaptively commands the positioning system in head 1 to move the fibers into coaxial alignment and abutment. The PAS system preferably operates iteratively to bring the fibers into as accurate alignment as the diffraction limit and resolution of the imaging optics permit.

After the fibers to be joined are aligned as accurately as possible using a PAS system, a LID system is preferably used for further optimization. The LID system incorporates means for injecting light into the first fiber through its buffer layer and corresponding means for detecting the intensity of light emerging through the buffer layer of a second fiber. Optimal fiber alignment prior to splicing is effected by manipulating the orientation and relative position of the fibers to maximize light transmission. In the LID method, light incident on the buffer jacket of the first fiber at an injection position penetrates the buffer and cladding, enters the core, and propagates through the first fiber, gap, and second fiber, emerging from the core of the second fiber through its cladding and buffer at a detection position. A light responsive element in the LID detector responds to the propagated light, providing an electronic signal that may be suitably filtered and processed to serve as input for control electronics that drive the motion means, preferably the piezoelectric actuators, to bring the fibers into alignment.

Following the improved alignment achieved using the LID system, the fibers are joined using the electric arc welding system of the present fusion splicing stage. Preferably the welding system employs electrodes 6, 8 mounted in horizontal, transverse, axially opposed relationship as depicted by FIGS. 1 and 6–7. In addition, it is preferred that the electrodes be located in the same vertical plane as the components of the imaging optical system and that an imaginary line connecting the electrodes pass through the point of abutment of the aligned fibers. Electrodes 6, 8 are adapted to be energized by high voltage supply, triggered automatically by control electronics after completion of fine fiber alignment. Too intense an arc melts the fibers excessively, causing formation of ball-like ends that retreat from the joint area. Too weak an arc does not allow enough heating to cause a mechanically stable joint to form. High transmission loss is likely in either extreme.

The compactness and rugged portability of a splicing system are further enhanced by features of the present splicing stage. The use of micropositioners such as piezo-electric and direct drive motors and the concomitant reduction or elimination of mechanical gears subject to misalignment and backlash enable the system to withstand the inevitable mechanical abuse, including shock, dirt, moisture, and other adversities that attend transporting and operating service equipment under field conditions. In addition, the use of lightweight micropositioners and related components further reduces gravity-induced bending and misalignment that generally have required previous splicing systems to be relatively large to have sufficient robustness. Moroever, such systems have to be calibrated and operated in a single, fixed orientation. By way of contrast, systems incorporating the present fusion head advantageously are operable in other arbitrary orientations, greatly facilitating the system's use for field service in cramped quarters.

Moreover, the configuration and component design of the present stage permit construction of a fusion splicing system that is compact and low profile, rendering it operable in very restricted quarters, such as very close to a wall, ceiling, floor, or cable support structure such as a cable tray. Advantageously, only a minimal amount of free slack is required to situate the fibers in such a splicer. These singular and advantageous features are a consequence of factors including the minimal clearance needed on the sides, top, and bottom of a housing for a splicing head that incorporates low profile, compact components, including the present splicing stage. Other components of the splicing system, including power sources, electronics, and user interface, may be connected to the splicing head but housed separately. The head itself may thus be made quite compact for operation in confined spaces. As far as possible, components that must be in the head are located rearward of the fiber path to allow the fiber edge to be as close as possible to the edge of the housing for greatest operational flexibility. In a preferred embodiment, the fusion head 1 is at most about 24 cm wide in the fiber direction, at most about 12 cm front to back, and 8 cm deep, and weighs at most about 2 kg. Advantageously such a fusion head is readily hand-carried and manipulated into position. The width of the fusion splicing head may be substantially reduced in embodiments that do not require LID functionality by omission of injector 100 and detector 200.

The markedly improved functionality and portability afforded by a splicer that employs the present fusion splicing stage is absent from existing systems which cannot perform high quality, low loss splices in the tight confines and adverse environmental and operational conditions for which fiber optic data and telecommunications systems are advantageously employed.

More specifically, the fusion splicing stage of the present invention is advantageously employed in the construction of a modular, low profile system for fusion splicing of optical fibers, preferably a system that employs a LID system in bringing the fibers into optimal alignment for fusion. As depicted by FIG. 1, the LID injector and detector are conveniently mountable on the opposite sides of the fusion splicing stage. Preferably the fusion stage uses removable clamp assemblies to secure the fibers. As a result, there is no need for clearance above the stage to accommodate the open position of the upwardly rotatable closures normally used in conventional systems for mounting and securing the fibers. The configuration of the LID system and the fusion splicing stage in FIG. 1 conveniently affords a path through the head of the splicer system for the two optical fibers being joined that is simple and direct. The fibers remain substantially in a single plane parallel to the surface of the splicer head, traversing a path that deviates from a straight line only insofar as necessary to provide sufficient bending to allow injection and extraction of light for operation of the LID technique. The supply ends of first fiber 20 and second fiber 30 enter injector 100 and detector 200, respectively, in directions that are substantially collinear. Likewise, the free ends of the fibers 20, 30 to be joined in joint 16 emerge from injector 100 and detector 200, respectively, along a common direction that is generally parallel the aforementioned supply direction and only slightly displaced therefrom. Furthermore, the LID injector and detector 100, 200 and the fusion splicing stage are preferably situated close to an edge of the splicing head housing.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A low profile splicing stage for fusion joining a first optical fiber and a second optical fiber, said stage comprising:
    a) an electric arc welding system;
    b) a clamping and fiber position adjustment system comprising holding means for holding said fibers in a fiber plane and motion means for moving said fibers in three orthogonal dimensions into coaxial, abutting alignment along a common fiber axis in said fiber plane; and
    c) an imaging optical system having a fiber imaging illuminator and a fiber image detector, said imaging optical system being adapted to acquire optical images of said fibers in a first imaging direction and a second imaging direction, said imaging directions being non-coincident, and said image detector providing an electrical signal adapted to be received by imaging electronics and processed to produce a display, said fiber imaging illuminator comprising a first light source for said first imaging direction and a second light source for said second imaging direction; light from said first source traversing a first optical path and light from said second source traversing a second optical path, each of said optical paths being multiply folded and comprising optical elements located above and below said fiber plane, and said first and second optical paths lying in a plane perpendicular to said common fiber axis.

2. A splicing stage as recited by claim 1, wherein said fiber imaging illuminator comprises a first light source for said first imaging direction and a second light source for said second imaging direction.

3. A splicing stage as recited by claim 1, wherein said first and second imaging directions are substantially mutually orthogonal.

4. A splicing stage as recited by claim 1, wherein said fiber image detector comprises a single imaging device.

5. A splicing stage as recited by claim 1, wherein said fiber image detector comprises a CMOS device.

6. A splicing stage as recited by claim 1, wherein said electric arc welding system comprises a first electrode and a second electrode disposed oppositely and coaxially along a direction perpendicular to said common fiber axis and adapted to be operably connected to fusion control electronics that activate said electric arc welding system and supply high voltage thereto, whereby said fibers are welded.

7. A splicing stage as recited by claim 1, said stage having a mounting base and further comprising a stage cover, at least a portion of which is movable in a plane parallel to said mounting base, said movable portion having an open position and a closed position.

8. A splicing stage as recited by claim 7, wherein said movable portion is slidably movable in said plane.

9. A splicing stage as recited by claim 7, wherein said stage cover is opaque.

10. A splicing stage as recited by claim 7, wherein said holding means comprises first and second joint clamps actuated by the motion of said stage cover, each having a flat portion adapted to secure the end of a fiber for fusion, said first joint clamp engaging the end of said first fiber and said second joint clamp engaging the end of said second fiber.

11. A splicing stage as recited by claim 1, wherein said holding means comprises first and second clamp assemblies.

12. A splicing stage as recited by claim 11, wherein said first and second clamp assemblies are removable and have alignment pins for locating said assemblies in said splicing stage.

13. A splicing stage as recited by claim 12, wherein said first and second removable clamp assemblies each comprise a flat portion, an aligning V-block, and a fiber clamp openable at a pivot.

14. A splicing stage as recited by claim 1, wherein said motion means comprises at least one electric motor adapted to drive at least one of said fibers.

15. A splicing stage as recited by claim 14, wherein said electric motor is configured to directly drive said fiber.

16. A splicing stage as recited by claim 14, comprising a first electric motor adapted to drive said first fiber axially and a second electric motor adapted to drive said second fiber axially.

17. A splicing stage as recited by claim 1, wherein said motion means comprises at least one piezoelectric actuator.

18. A splicing stage as recited by claim 17, wherein said motion means comprises a first transverse piezoelectric actuator adapted to drive one of said fibers in a first transverse direction substantially perpendicular to said common fiber axis; and a second transverse piezoelectric actuator adapted to drive one of said fibers in a second transverse direction substantially perpendicular to said first transverse direction and said common fiber axis.

19. A splicing stage as recited by claim 18, wherein said first transverse piezoelectric actuator is adapted to drive said first fiber and said second transverse piezoelectric actuator is adapted to drive said second fiber.

20. A splicing stage as recited by claim 18, wherein said first and said second transverse piezoelectric actuators are adapted to drive one of said fibers.

21. A splicing stage as recited by claim 17, wherein said motion means comprises an axial piezoelectric actuator adapted to drive one of said fibers in a direction along said common fiber axis.

* * * * *